United States Patent [19]

Tan et al.

[11] 4,251,642

[45] Feb. 17, 1981

[54] COMPATIBLE POLYURETHANE BLENDS

[75] Inventors: King-Han Tan, Alkmaar; Jan L. de Greef, Amsterdam, both of Netherlands

[73] Assignee: Borg-Warner Corporation, Chicago, Ill.

[21] Appl. No.: 66,719

[22] Filed: Aug. 15, 1979

[51] Int. Cl.³ .................... C08L 55/02; C08L 75/00; C08L 53/02

[52] U.S. Cl. ..................... 525/66; 525/71; 525/92

[58] Field of Search ..................... 525/66, 92

[56] References Cited

U.S. PATENT DOCUMENTS

| | | | |
|---|---|---|---|
| 3,049,505 | 8/1962 | Grabowski | 525/66 |
| 3,562,355 | 2/1971 | Holden | 525/92 |
| 3,970,717 | 7/1976 | Muller | 525/66 |
| 4,007,311 | 2/1977 | Harlan | 525/66 |
| 4,022,745 | 5/1977 | Schoen | 525/92 |
| 4,048,255 | 9/1977 | Hillier | 525/92 |
| 4,179,479 | 12/1979 | Carter | 525/66 |

FOREIGN PATENT DOCUMENTS

| | | | |
|---|---|---|---|
| 634394 | 1/1962 | Canada | 525/66 |
| 54-7827 | 4/1979 | Japan | 525/66 |
| 1001953 | 8/1965 | United Kingdom | 525/66 |

*Primary Examiner*—Paul Lieberman
*Attorney, Agent, or Firm*—Joseph Shekleton

[57] ABSTRACT

A blend of certain polyurethanes with a block copolymer of styrene and certain conjugated diolefins and a graft copolymer of styrene, acrylonitrile and butadiene. Methyl methacrylate may be substituted for all or a portion of the acrylonitrile. The blend retains the good properties of the individual polymers and is otherwise characterized by a stable compatibility.

10 Claims, No Drawings

COMPATIBLE POLYURETHANE BLENDS

The invention of this application is a blend of polymers which has good impact strength, is flexible and yet hard, and has good resistance to scuffing. Moreover, the blended polymers are compatible with each other.

The above physical properties all are important in many applications. Automobile bumpers require these properties to a high degree. So does the material that is used in the manufacture of footwear, especially sport boots. Many other uses suggest themselves for a material having this combination of properties.

In almost all instances, the materials presently used for these applications are expensive, so that there is a strong incentive to develop a substitute. Polyurethanes are a typical raw material for the manufacture of ski boots, for example, but these polyurethanes are relatively expensive. Nevertheless, they have the rigidity of plastics and the resiliency of rubber and are thus well suited to this type of application.

The recent development of block copolymers from such monomers as styrene and conjugated dienes has made available a valuable raw material for many applications. In many cases such copolymers exhibit elastomeric properties at ambient temperatures and are thermoplastic at elevated temperatures. They exhibit the general characteristics of vulcanized rubbers but do not require vulcanization to attain these properties. Depending on the monomer composition, i.e., the proportion of styrene in the block copolymer, the properties of the polymer will resemble those of vulcanized rubber, as with a high conjugated diene content, or with a high styrene content the polymer will more nearly resemble a thermoplastic material such as a high impact polystyrene. The range of desirable possibilities is apparent and these block copolymers have found wide usage.

Nevertheless, for some uses, such block copolymers are not entirely satisfactory. Some of the required properties for sport boot material, for example, are hardness and scuff resistance and presently available block copolymers do not provide these properties to the extent desired.

Graft copolymers having a rubbery backbone likewise are very useful in a number of applications, because of their good impact properties, i.e., their resistance to breakage upon impact, and also because of their high gloss. These properties permit the use of these materials in the fabrication of business machines, telephones, television cabinets and the like. An insufficient flexibility, however, precludes their use in many other applications.

The combination of a polyphenylene oxide, a block copolymer of a vinyl aromatic compound with a conjugated diene and a graft interpolymer of an acrylic monomer with a diene rubber, is shown in U.S. Pat. No. 3,833,687. A similar combination wherein the graft interpolymer is a graft copolymer of a diene rubber with a styrene monomer is shown in U.S. Pat. No. 3,835,200. A process for polymerizing a mixture of styrene and acrylonitrile in the presence of a block copolymer of an ethylene-propylene copolymer and a diene rubber, is shown in U.S. Pat. No. 3,719,731. Shell Chemicals Technical Bulletin RBX/76/3 shows the combination of styrene/butadiene/styrene block copolymers with polystyrene, with polyethylene and with polypropylene. The combination of a graft copolymer of polybutadiene, styrene and acrylonitrile, and a polyurethane is shown in U.S. Pat. No. 3,049,505. The combination of a block copolymer of styrene and butadiene and a polyester polyurethane is shown in U.S. Pat. No. 3,562,355.

The present invention is a blend of polymers comprising (1) a block copolymer of styrene and a conjugated diolefin of 4–6 carbon atoms, (2) a graft copolmyer wherein a polymer of styrene and up to 40 parts, based on the weight of graft copolymer, of acrylonitrile and/or methyl methacrylate is grafted onto a rubbery substate which is polybutadiene or a copolymer of butadiene, styrene, and up to 10% (based on substrate) of acrylonitrite and (3) a thermoplastic elastomeric polyurethane containing a relatively high molecular weight segment of a polyester.

The above blend is characterized by good flexibility, hardness, resistance to impact, gloss, abrasion-resistance and scuff resistance. Moreover, its cost is much less than that of presently used materials which it would replace in the market. The unexpected compatibility of these polymers permits the formulation of a wide range of compositions having a corresponding range of the above desirable properties.

BLOCK COPOLYMER

The conjugated diolefin of the block copolymer generally is butadiene or isoprene, preferably butadiene; 2,3-dimethylbutadiene is also contemplated. The block copolymer is characterized by styrene end blocks with elastomeric diolefin center blocks, i.e., it has an ABA structure where B is an elastomeric polymer unit. A preferred embodiment is a styrene-butadiene-styrene block copolymer.

The block copolymers herein are linear and may be prepared by sequential anionic polymerization of styrene, the conjugated diolefin and, finally, styrene. Thus, for example, styrene is polymerized in the presence of an alkyl lithuim catalyst to form a so-called "living polymer", butadiene is added to this living polymer to continue the polymerization with the formation of an intermediate block A-B-Li (still a living polymer), then more styrene is added to form a second polystyrene block, and finally a terminating agent is added. Alternatively, the A-B-Li living polymer may be coupled with itself. The result in either case is an ABA block copolymer. The polystyrene blocks each have a molecular weight between about 10,000 and 45,000 and the polystyrene block has a molecular weight between 35,000 and 150,000. The details of processes by which these block copolymers can be prepared may be found in U.S. Pat. No. 3,231,635; U.S. Pat. Nos. 3,239,478; 3,265,765, and Allport and Jones, "Block Copolymers" (pp. 81–87), Applied Science Publishers, London (1973).

GRAFT COPOLYMER

The graft copolymers of this invention may be prepared by known methods such as (1) preparing a polymer latex (substrate) by polymerizing (in an aqueous emulsion) butadiene or a mixture of butadiene, styrene and up to 10% (based on monomer content of the latex) of acrylonitrile, (2) adding to said latex a mixture of styrene and up to 40% of acrylonitrile and/or methyl methacrylate (based on monomer content of the added mixture), and (3) polymerizing the mixture of (2). Thus, the polymer latex of (1) may be polybutadiene, a copolymer of butadiene and styrene or a copolymer of butadiene, styrene and acrylonitrile. As little as 15% and up to 70% of styrene, based on the overall monomer content, may be present in the graft copolymer; and the mixture of (2) may be styrene and acrylonitrile, styrene and methyl methacrylate, or styrene, acrylonitirile and methyl methoacrylate. The butadiene content of the graft copolymer will range from about 10% to about 60%.

Cross-linking agents can be used as desired in the above process. They may be used both in the step of preparing the latex and in step (3) involving preparation of the superstate. Illustrative cross-linking agents include divinylbenzene, and dimethacrylates such as mono-, di-, tri- and tetraethylene glycol dimethacrylate and 1,3-butylene glycol dimethacrylate, triallyl phosphate, triallyl cyanurate, tetraallyl silane, diallyl itaconate, diethylene glycol diacrylate, etc.

Methods of making the graft copolymers herein are well known. U.S. Pat. No. 2,802,808 (Hayes), for example, shows methods of preparing ABS resins, as does also U.S. Pat. No. 2,994,683 (Calvert). The MBS resins and other graft copolymers herein are prepared similarly.

Preferred graft copolymers are those wherein the superstrate, i.e., the grafted polymer, is a copolymer of styrene and acrylonitrile and the substrate is polybutadiene. Another preferred species is an MABS resin, i.e., one where the superstrate is a grafted copolymer of acrylonitrile, methyl methacrylate and styrene. Still another preferred species (MBS) is prepared by copolymerizing styrene and methyl methacrylate in the presence of polybutadiene (as the substrate).

Mixtures of graft copolymers may be used. Thus, two different ABS resins may be used, or a mixture of an ABS resin and an MABS resin, or a mixture of an MBS resin and an MABS resin, or a mixture of two different MBS resins, or a mixture of an ABS resin and two different MABS resins.

A particularly preferred graft copolymer is one wherein a copolymer of from about 70 parts to about 90 parts of styrene and from about 10 parts to about 30 parts of methyl methacrylate is grafted onto a polybutadiene substrate.

POLYURETHANE

The polyurethane component of the polymer blends herein are derived from polyesters. More particularly, they are derived from polyesters containing hydroxyl end groups. These polyesters may in turn be prepared either by condensation of approximately equivalent proportions of a glycol and a dicarboxylic acid (or anhydride thereof), or by reacting a lactone having at least six carbon atoms in the lactone ring with a small proportion of a bifunctional initiator such as a glycol, an amino alcohol or a diamine. In either case, the molecular weight of the polyester is relatively high, i.e., within the range of from about 1000 to about 3000.

Where the polyester is prepared by condensation of a glycol and a dicarboxylic acid, the glycol is one containing 2-6 carbon atoms, e.g., ethylene, trimethylene, tetramethylene, hexylene and propylene glycols. The dicarboxylic acid is aliphatic and contains 2-8 carbon atoms, e.g., succinic, glutaric, adipic, pimelic and suberic acids. The condensation polymerization is carried out by known methods.

Alternatively, the polyester may as indicated be derived by polymerization of a lactone such as caprolactone. The polymerization is accomplished merely by mixing the lactone and bifunctional initiator at an elevated temperature, e.g., between about 120° C. and 200°. Preferably, a catalyst is used, at a concentration of from about 0.001% to about 0.5%. A wide variety of catalysts are effective, and basic and neutral ester interchange catalysts are preferred. More specific information regarding the process for preparing lactone polyesters of the type contemplated herein may be found in U.S. Pat. No. 2,933,477 and 2,933,478.

The above linear dihydroxy polyester may be reacted with an excess of an aromatic diisocyanate, such as 4,4'-diphenylmethane diisocyanate (MDI) or tolylene diisocyanate (TDI), at 80°-120° C., to give a prepolymer which is a mixture of the excess unreacted diisocyanate and a diisocyanate-terminated polymeric diol. This mixture then may be reacted with a chain extender in such stoichiometric proportions as to just react with all the free isocyanate groups. The chain extender may be a low molecular weight glycol having 2-10 carbon atoms, e.g., ethylene glycol, 1,4-butanediol, 1,4-bis (2-hydroxithoxy) benzene and 1,6-hexamethylene glycol. A typical polyurethane contemplated herein may be prepared from 1 molar equivalent of a dihydroxy polyester, 6 molar equivalents of a diisocyanate and 5 molar equivalents of a chain extender. Generally, it is desirable to use 2-6 mols of diisocyanate per mol of dihydroxy polyester.

The polyurethanes herein are preferably cross-linked. Cross-linking may be accomplished merely by use of a slight excess of diisocyanate.

The steps of preparing the prepolymer mixture and the final polyurethane product may be combined and carried out as a single step.

Additional process information may be had by referring to Allport and Janes, "Block Copolymers", pp. 227-234, Applied Science Publishers, London (1973).

COPOLYMER BLENDS

The relative proportions of the polymers present in the blend of the invenion are from about 25 to about 80 parts of block copolymer, from about 10 to about 50 parts of graft copolymer, and from about 5 to about 50 parts of polyurethane. Obviously, the properties of the blend will vary with its composition.

The polymer blends herein may be prepared by melt mixing the indicated polymers, usually with intensive mixers, e.g., a Banbury mixer, or with any of variously available single and multi-screw extruders.

The compatibility of the polymeric components of the polyurethane blends herein is shown in Table I. The rating is based on considerations of whether or not a sample (a pressed placque or injection molded placque) delaminates or cracks when bent, and the general homogeneity of appearance of the sample. The samples are rated on a scale of 1-10 where 1 is bad (incompatible) and 10 is good (compatible).

TABLE I

|    | MABS | ABS | PU-1 | PU-2 | SBS-1 | SBS-2 | RATING |
|----|------|-----|------|------|-------|-------|--------|
| 1. | 20   |     |      | 10   | 70    |       | 6.5    |
| 2. | 27   |     |      | 18   | 55    |       | 6.5    |
| 3. | 22   |     |      | 11   | 67    |       | 6.5    |
| 4. | 14   |     |      | 43   | 43    |       | 6.5    |
| 5. | 20   |     | 40   |      | 40    |       | 9.5    |
| 6. |      | 30  | 35   |      | 35    |       | 9.0    |
| 7. | 30   |     | 35   |      | 35    |       | 9.0    |
| 8. | 30   |     | 35   |      |       | 35    | 9.0    |

In the above table the headings have the following meanings:

MABS: A graft copolymer in which the substrate is a 19-57 copolymer of styrene and butadiene and the superstrate is derived from a mixture of 20 parts of methyl methacrylate and 4 parts of acrylonitrile.

ABS: A graft polymer in which the substrate is polybutadiene and the superstrate is derived from a mixture of 32 parts of styrene and 18 parts of acrylonitrile.

PU-1: A slightly cross-linked polyurethane derived from polycaprolactone having a Shore D hardness of 53.

PU-2: A slightly cross-linked polyurethane derived from a lower alkylene adipate having a Shore D hardness of 53.

SBS-1: A styrene-butadiene-styrene block copolymer containing 0.5% of Irganox 1076 (n-octadecyl 3-(3',5'-ditertiarybutyl-4-hydroxyphenyl) propionate). It has a Shore A hardness of 62, a tensile strength of 4600 psi, a molecular weight (GPC) of 150,000-200,000, a styrene content of 28%, and a solution viscosity (25% in toluene) of 1220 cps.

SBS-2: Like SBS-1, but of slightly higher molecular weight, has a Shore A hardness of 46, and contains about 30% of a low aromatic naphthenic oil plasticizer.

It will be seen that the blends all are compatible and that some are especially so. These blends, as mentioned earlier, are characterized by good scuff-resistance, gloss, hardness, abrasion resistance, flexibility and impact-resistance. Moreover, they are relatively inexpensive, as compared to polyurethane itself.

All parts and percentages herein, unless otherwise expressly stated, are by weight.

We claim:

1. A blend of polymers comprising (1) from about 2.5 to about 80 parts of a block copolymer of styrene and a conjugated diolefin of 4-6 carbon atoms, (2) from about 10 to about 50 parts of a graft copolymer wherein a polymer of styrene and up to 40 parts, based on the weight of graft copolymer, of acrylonitrile and/or methyl methacrylate is grafted onto a rubbery substrate which is polybutadiene or a copolymer of butadiene, styrene, and up to 10% of acrylonitrile, and (3) from about 5 to about 50 parts of a thermoplastic elastomeric polyurethane containing a relatively high molecular weight segment of a polyester.

2. The blend of claim 1 wherein the block copolymer is a copolymer of butadiene and styrene.

3. The blend of polymers of claim 1 wherein the block copolymer is a styrene-butadiene-styrene block copolymer.

4. The blend of polymers of claim 1 wherein the rubbery substrate of the graft copolymers if polybutadiene.

5. The blend of polymers of claim 1 wherein the graft copolymer is prepared by grafting a copolymer of styrene and acrylonitrile onto a rubbery substrate.

6. The blend of polymers of claim 1 wherein the graft copolymer is prepared by grafting a copolymer of styrene and methyl methacrylate onto a rubbery substrate.

7. The blend of polymers of claim 1 wherein the graft copolymer is prepared by grafting a copolymer from about 70 parts to about 90 parts of styrene and from about 10 parts to about 30 parts of methyl methacrylate onto a rubbery substrate.

8. The blend of polymers of claim 1 wherein the polyester segment of the polyurethane is a polycaprolactone.

9. The blend of polymers of claim 1 wherein the polyester segment of the polymethane is a lower alkylene adipate.

10. The blend of polymers of claim 1 wherein the polyurethane is cross-linked.

* * * * *